United States Patent [19]

Yamashita

[11] 4,279,177
[45] Jul. 21, 1981

[54] VARIABLE SPEED TRANSMISSION

[76] Inventor: Masaaki Yamashita, 3-18 4-chome, Inabaso, Amagasaki-shi, Hyogo-ken, Japan

[21] Appl. No.: 31,166

[22] Filed: Apr. 18, 1979

[30] Foreign Application Priority Data

Apr. 18, 1978 [JP] Japan ................................. 53/046368

[51] Int. Cl.³ ............................................. F16H 37/06
[52] U.S. Cl. ........................................ 74/675; 74/681
[58] Field of Search ................. 74/675, 681, 690, 688, 74/686

[56] References Cited

U.S. PATENT DOCUMENTS

| 2,376,429 | 5/1945 | Harry | 74/681 |
| 2,467,226 | 4/1949 | Place | 74/681 |

FOREIGN PATENT DOCUMENTS 1048113  6/1956  Fed. Rep. of Germany ............. 74/675

Primary Examiner—C. J. Husar
Assistant Examiner—Frank Mc Kenzie
Attorney, Agent, or Firm—George B. Oujevolk

[57] ABSTRACT

An internal gear assembly comprising an internal gear and a pinion in mesh therewith is connected to either of a transmission input shaft and output shaft. A first sun gear fixedly mounted on the other of the input and output shafts meshes with a planet gear set rotatably carried by a planet carrier. Formed integral with a hollow shaft, the planet carrier is rotatable about the aligned axis of the input and output shafts. An eccentric shaft rotatably extends through an eccentric bore in the hollow shaft and is connected at one end to the internal gear assembly. A second sun gear is fixedly mounted on the other end of the eccentric shaft and meshes with the planet gear set. The speed ratio of the input and output shafts can be varied infinitely as by an electric motor geared to the planet gear set via an idler gear rotatably mounted on the hollow shaft. Additional embodiments are disclosed to accomplish the same objective.

6 Claims, 4 Drawing Figures

VARIABLE SPEED TRANSMISSION

BACKGROUND OF THE INVENTION

1. Field of the Invention

My invention relates to transmissions or drives for the transfer of power from one shaft to another, and in particular to a variable speed transmission permitting the speed ratio of the shafts to be varied infinitely or continuously. The variable speed transmission according to my invention is adaptable for use with machine tools, motor vehicles, and a variety of other pieces of machinery.

2. Description of the Prior Art

There have been suggested and used many and varied methods of providing a variable speed output for driving a desired piece of machinery. Basically, such methods are either (1) mechanical, (2) hydraulic, or (3) electrical. Numerous forms of these basic methods exist, however, resulting in considerable difficulty in choosing a particular drive or transmission assembly for any intended application.

While each variable speed drive of prior art design may be admirably suitable for certain specific applications, it also has one or more of such drawbacks as poor efficiency, low output torque, narrow speed range, noncontinuous or stepwise speed change, and necessity for stopping the machine in order to change speed.

More recent developments in electronics have widened the choice still further by employing the thyristor, or silicon controlled rectifier, in association with a direct current motor to provide an infinitely variable drive system. This advanced system is also not free from certain disadvantages, however, such as high capital cost and comparatively low output torque at low speed. Its use in applications demanding a wide speed range is also subject to a question.

SUMMARY OF THE INVENTION

It is an object of my invention to provide an improved variable speed transmission which permits the speed ratio to be varied infinitely over an extremely wide range and which is highly efficient, inexpensive, and capable of withstanding heavy loads.

Another object of my invention is to provide a variable speed transmission of simplified basic configuration readily adaptable to meet a great variety of drive requirements.

In summary the variable speed transmission according to my invention includes an input shaft and an output shaft in axial alignment with each other. Connected to either of the input shaft and the output shaft is an internal gear assembly comprising an internal gear and a pinion in mesh therewith. On the other of the input shaft and the output shaft is fixedly and coaxially mounted a first sun gear in mesh with a planet gear set. This planet gear set is rotatably mounted on a planet carrier which is itself rotatable about the axis of the aligned input and output shafts. Connected at one end to the internal gear assembly, an eccentric shaft is also rotatably supported by the planet carrier for rotation about an axis offset from and parallel to the axis of the aligned input and output shafts. The eccentric shaft is further revolvable with the planet carrier about the input and output shaft axis. A second sun gear is fixedly and coaxially mounted on the other end of the eccentric shaft and meshes with the planet gear set. The transmission further includes means interposed between the input and output shafts for continuously varying their speed ratio.

One of the notable structural features of the variable speed transmission according to my invention resides in the internal gear assembly which can be connected to either the input or the output shaft. It is essential, however, that the internal gear of the assembly be connected on the input side, and the pinion in mesh therewith on the output side. Thus, when the internal gear assembly is connected to the output shaft, for example, the internal gear is fixedly and coaxially mounted on the eccentric shaft, and the pinion is fixedly and coaxially mounted on the output shaft. When the internal gear assembly is connected to the input shaft, on the other hand, the internal gear is fixedly and coaxially mounted on the input shaft, and the pinion is fixedly and coaxially mounted on the eccentric shaft.

The variable speed transmission of the above broad outline is designed to utilize the reaction torque from the loaded output shaft as an additional input. Consequently, when an electric motor, for example, is employed as the means for continuously varying the speed ratio, in addition to the main drive motor or the like connected to the transmission input shaft, the transmission may be considered to have three inputs. Various other means can be used to continuously vary the speed ratio, as disclosed in the subsequently presented embodiments of my invention.

The above and various other objects, features and advantages of my invention and the manner of attaining them will become more clearly apparent, and the invention itself will best be understood, from the following description and appended claims taken in conjunction with the accompanying drawings showing several preferred embodiments of my invention.

DESCRIPTION OF THE PREFERRED EMBODIMENTS

Figure 1:
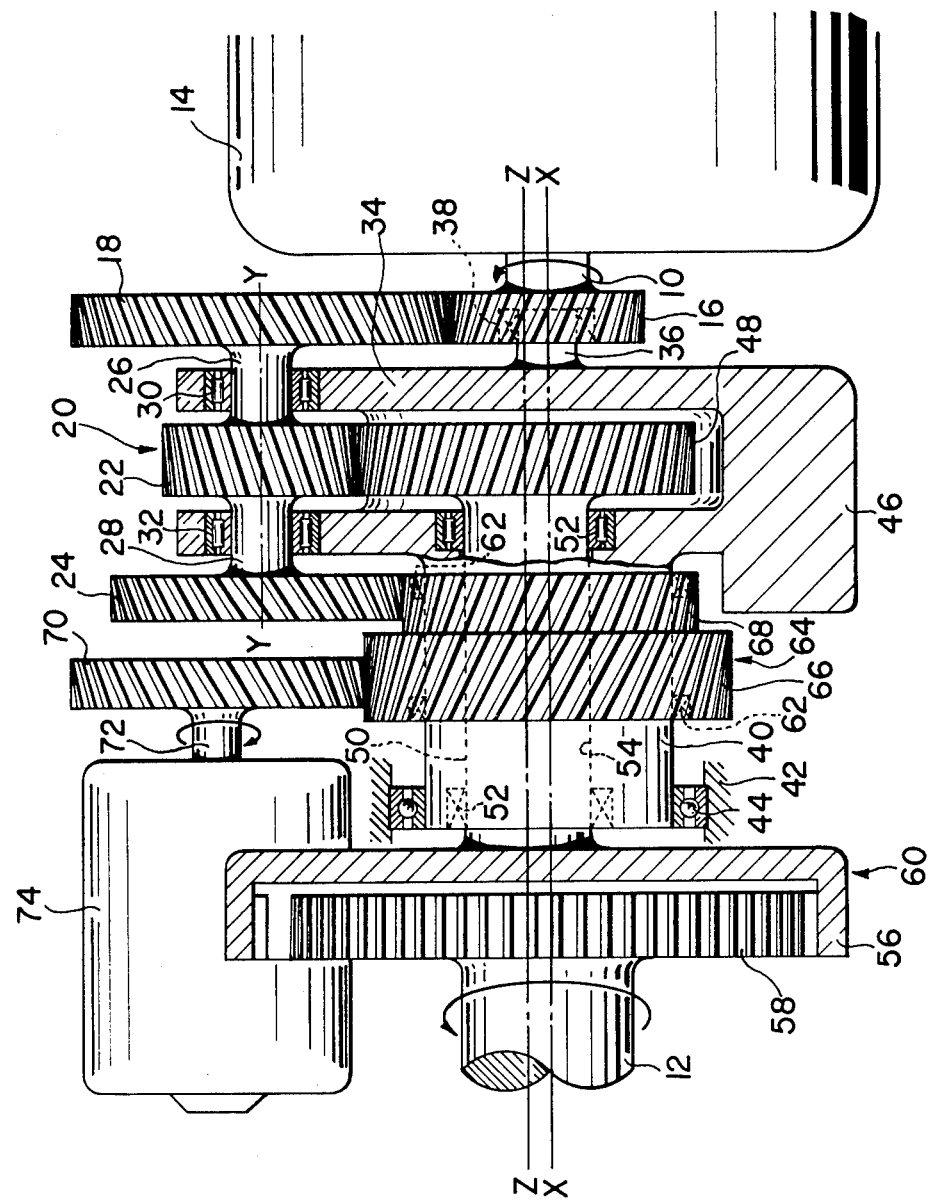
FIG. 1 shows, partly in side elevation and partly in section, a preferred form of the variable speed transmission according to my invention, the transmission having the internal gear assembly connected to the output shaft and incorporating an electric motor for changing the speed ratio.

With reference to FIG. 1 the first preferred form of the variable speed transmission according to my invention includes an input shaft 10 and an output shaft 12 aligned for rotation about a common axis X-X. In this particular embodiment the input shaft 10 is, in effect, the output shaft of an electric drive motor 14 such as, for example, a synchronous motor or an induction motor.

The output shaft 12 is to be connected to a desired piece of machinery to be driven at a variable speed.

Fixedly and coaxially mounted on the input shaft 10 is a first sun gear 16 meshing with a first planet gear 18. This first planet gear is a member of a planet gear set, generally designated 20, additionally comprising second 22 and third 24 planet gears. A spindle 26 rigidly and coaxially interconnects the first 18 and second 22 planet gears, and another spindle 28 rigidly and coaxially interconnects the second 22 and third 24 planet gears. These spindles 26 and 28 are journaled in respective bearings 30 and 32 in a planet carrier 34. The planet gear set 20 is therefore jointly rotatable about the axis Y-Y of the aligned spindles 26 and 28, the axis Y-Y being parallel to the first recited axis X-X.

The planet carrier 34 integrally includes a spindle 36 projecting from its input side and journaled in a bearing 38 within the first sun gear 16. Also formed integral with the planet carrier 34 is a hollow shaft 40 projecting from its output side and rotatably supported by a stationary part 42 via a bearing 44. Both spindle 36 and hollow shaft 40 are in axial alignment with the input shaft 10 and output shaft 12. The planet carrier 34 together with the hollow shaft 40 is therefore also rotatable about the axis X-X. It is thus seen that the planet gear set 20 is both rotatable about the axis Y-Y and revolvable about the axis X-X. The planet carrier 34 further integrally includes a balance weight 46 disposed diametrically opposite to the planet gear set 20.

The second planet gear 22 of the planet gear set 20 meshes with a second sun gear 48 which is fixedly and coaxially mounted on one end of an eccentric shaft 50. Disposed between input shaft 10 and output shaft 12, the eccentric shaft 50 is rotatably received, via bearings 52, in a bore 54 formed eccentrically through the hollow shaft 40. The other end of the eccentric shaft 50, projecting out of the hollow shaft 40, is rigidly and coaxially connected to an internal gear 56. Thus the second sun gear 48, the eccentric shaft 50 and the internal gear 56 are jointly rotatable about an axis Z-Z offset from and parallel to the axis X-X. It will also be seen that with the rotation of the planet carrier 34 about the axis X-X, the second sun gear 48, the eccentric shaft 50 and the internal gear 56 revolve about the axis X-X.

The internal gear 56 meshes with a pinion 58 fixedly and coaxially mounted on the output shaft 12. The internal gear 56 and the pinion 58 form in combination an internal gear assembly generally labeled 60.

Rotatably and coaxially mounted on the hollow shaft 40 via bearings 62 is a stepped idler gear 64 integrally comprising a large diameter section 66 and a small diameter section 68. The large diameter section 66 of the idler gear 64 meshes with a ratio change gear 70 fixedly mounted on the output shaft 72 of a ratio change motor 74. The small diameter section 68 of the idler gear 64 meshes with the third planet gear 24 of the planet gear set 20 and thus serves as the third sun gear.

OPERATION

In the operation of the variable speed transmission of FIG. 1 the drive motor 14 and the ratio change motor 74 may be set in rotation in the directions of the arrows as marked, with the transmission output shaft 12 connected to a desired piece of machinery. Initially, however, the drive motor 14 is unable to rotate the loaded output shaft 12. The output torque of the ratio change motor 74 flows through the ratio change gear 70, the idler gear 64, the planet gear set 20, the second sun gear 48, the eccentric shaft 50, the internal gear 56, and the pinion 58.

Attempting to drive the pinion 58, the internal gear 56 receives reaction torque therefrom, the pinion being loaded by the machine connected to the output shaft 12. Since the internal gear 56 is out of axial alignment with the pinion 58, the noted reaction torque on the internal gear causes, via the eccentric shaft 50 rigidly connected thereto, the integral hollow shaft 40 and planet carrier 34 to rotate about the axis X-X in the same direction as the input shaft 10.

This means that the reaction torque equal to the output torque of the ratio change motor 74 has returned to the planet gear set 20. Thus the torque acting on the planet gear set 20 doubles, because the output torque of the ratio change motor 74 still exists. The displacement of the planet gear set 20 serves to make use of the output torque of the drive motor 14, and now the transmission output torque twice the output torque of the ratio change motor 74 tries to rotate the output shaft 12. Again the planet gear set 20 receives the reaction torque via the hollow shaft 40 and the planet carrier 34. This reaction torque again combines with the output torque of the ratio change motor 74, so that the torque acting on the planet gear set 20 triples.

The above process repeats itself until finally the transmission output torque overcomes the load on the output shaft 12 and starts driving same at a desired speed. The output torque of the drive motor 14, therefore, flows through the path sequentially comprising the first sun gear 16, the planet gear set 20 (where the torque combines with the ratio change motor output torque), the second sun gear 48, the eccentric shaft 50, the internal gear assembly 60, the hollow shaft 40, the planet carrier 34, the planet gear set 20 (where the torque again combines with the ratio change motor output torque), the second sun gear 48, the eccentric shaft 50, the internal gear assembly 60, and the output shaft 12.

The flow path of the drive motor output torque forms a loop, as above, on its way from input shaft 10 to output shaft 12. The output speed and output torque of the transmission may be varied at will by adjusting the output of the ratio change motor 74.

One of the most pronounced operational features of the variable speed transmission according to my invention resides in the fact that the hollow shaft 40 integral with the planet carrier 34 is more powerful than the input shaft 10 or the output shaft 12, predominating over the transmission. The transmission utilizes as an input the reaction torque imposed upon the internal gear 56 by the loaded pinion 58. Employing the ratio change motor 74, therefore, the transmission of FIG. 1 may be thought of as having three inputs. It will also be appreciated that, at least theoretically, the output of the ratio change motor 74 can be infinitely small.

In one application of the transmission of FIG. 1 a synchronous motor is employed as the drive motor 14, and a pulse motor as the ratio change motor 74. Since the output speeds of these motors are determined respectively by the frequency of the alternating current and by the repetition rate of the pulses, the transmission provides a highly accurate output speed. The speed ratio of the transmission input and output shafts can be varied continuously, also with utmost accuracy, by means of a control system that will readily occur to the specialists.

SECOND FORM

Although the variable speed transmission of FIG. 1 has the internal gear assembly 60 connected to its output shaft, it is also possible to connect this internal gear assembly to the input shaft. The transmission of FIG. 2 embodies this alternative. In the subsequent description of this FIG. 2 embodiment, various parts of the transmission will be identified by the same reference numerals as those used to denote their corresponding parts, if any, in the FIG. 1 embodiment, but with the digit "1" prefixed to such numerals.

Figure 2:
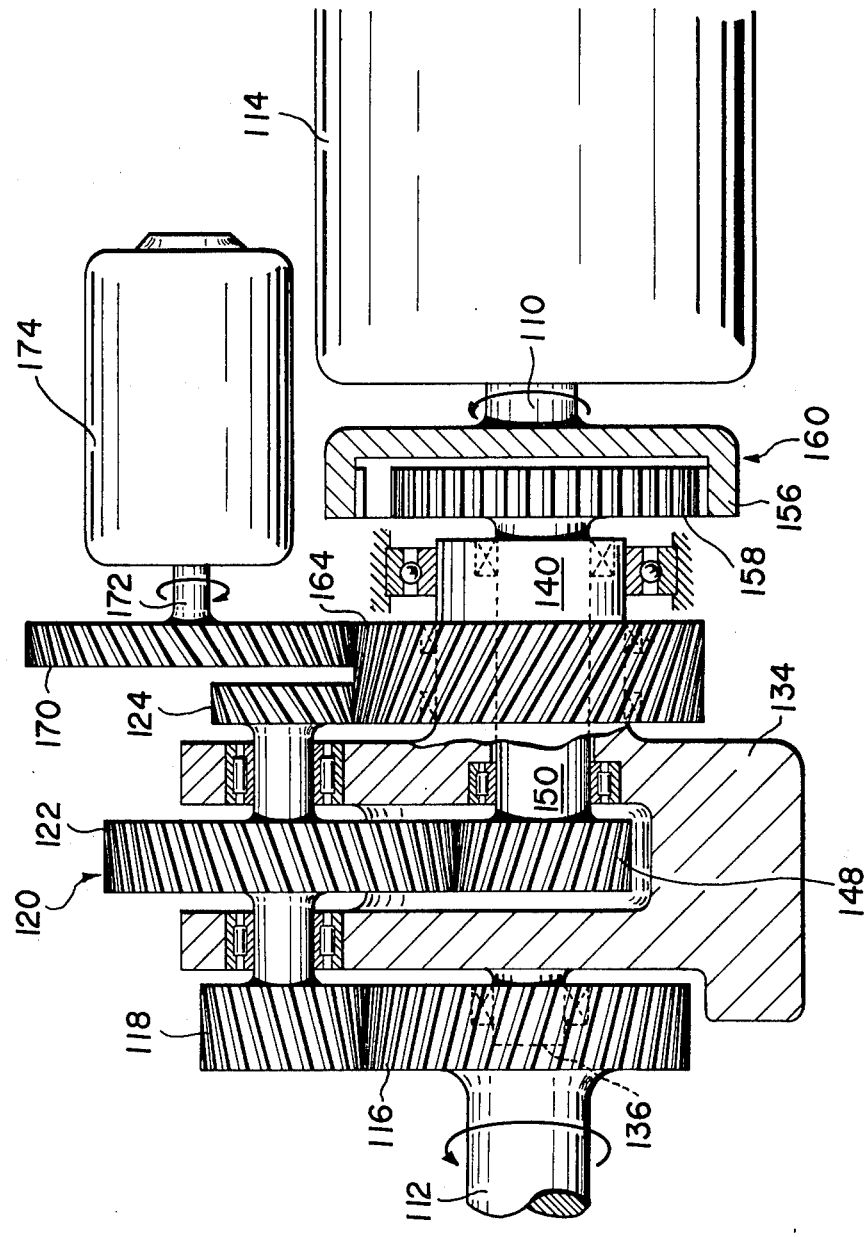
FIG. 2 is a similar view of a modified form of the transmission of FIG. 1, the modified transmission having the internal gear assembly connected to the input shaft.

The transmission of FIG. 2 includes an input shaft 110, or the output shaft of a drive motor 114, connected coaxially to the internal gear 156 of an internal gear assembly 160. The other member of the internal gear assembly 160, a pinion 158 meshes with the internal gear 156 and is fixedly and coaxially mounted on one end of an eccentric shaft 150. This eccentric shaft is rotatably and eccentrically supported by a hollow shaft 140 integral with a planet carrier 134.

Fixedly and coaxially mounted on the other end of the eccentric shaft 150 is a sun gear 148 (termed the second sun gear in the FIG. 1 embodiment) meshing with a planet gear 122 of a planet gear set 120 rotatably supported by the planet carrier 134. The planet gear set 120 includes two other planet gears 118 and 124 in axial alignment with the first recited planet gear 122. The planet gear 118 meshes with the sun gear 116 (termed the first sun gear in the FIG. 1 embodiment) fixedly and coaxially mounted on a transmission output shaft 112. The planet carrier 134 has a spindle 136 rotatably journaled in the sun gear 116.

The planet gear 124 meshes with an idler gear 164 rotatably and coaxially mounted on the hollow shaft 140. Also meshing with this idler gear 164 is a ratio change gear 170 on the output shaft 172 of a ratio change motor 174.

The input shaft 110 and the output shaft 112 are in axial alignment. The pinion 158 of the internal gear assembly 160, the eccentric shaft 150 and the sun gear 148 are rotatable about an axis offset from the parallel to the axis of the aligned input and output shafts. The planet carrier 134, together with the various parts rotatably supported thereby, is rotatable about the axis of the aligned input and output shafts. The other details of construction are believed apparent from the showing of FIG. 2 and from the previous description of FIG. 1.

Essentially, the various parts of the FIG. 2 transmission are arranged in mirror image relationship to those of the FIG. 1 transmission, so that its operation will also be apparent from the operational description of FIG. 1. It will suffice to say that the FIG. 2 transmission can also be considered to have three inputs.

THIRD FORM

Figure 3:
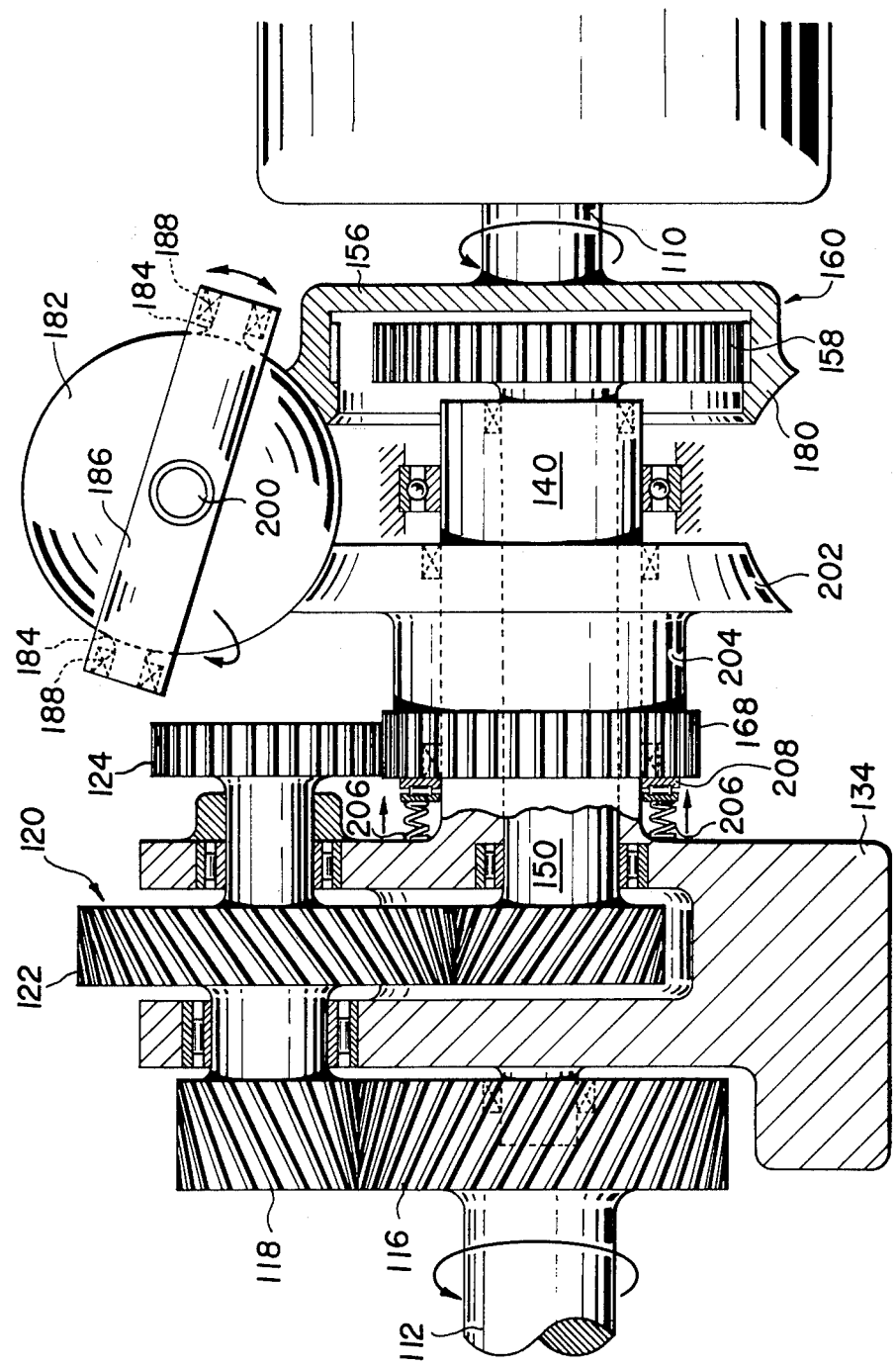
FIG 3 is a similar view of a further preferred form of the transmission according to my invention, which basically is of the type shown in FIG. 2 but which differs therefrom in the use of a friction ball to effect the change of speed.

A further preferred embodiment of my invention shown in FIG. 3 differs from the two preceding embodiments in that the former does not use the ratio change motor 74 or 174. The FIG. 3 embodiment is similar in basic configuration to that of FIG. 2, however, so that the same reference numerals will be employed to designate the corresponding parts of these two embodiments.

Connected to the transmission input shaft 110, the internal gear 156 of the internal gear assembly 160 is formed integral with a friction wheel 180. This friction wheel frictionally contacts a ratio change friction ball 182 having a pair of aligned trunnions 184 projecting from diametrically opposite positions thereon and rotatably supported by a support frame 186 of rectangular shape via bearings 188. The axis of the aligned trunnions 184 lies in coplanar relationship to the axis of rotation of the friction wheel 180 and therefore of the input shaft 110.

The support frame 186 of the ratio change friction ball 182 is itself provided with a pair of trunnions 200 (one seen) projecting from its opposite sides. The axis of the support frame trunnion pair 200 extends at right angles with the axis of the friction ball trunnion pair 184. The support frame 186 is to be pivoted about its trunnion pair 200 in order to adjustably vary the angle of the rotational axis of the ratio change friction ball 182 relative to the rotational axis of the friction wheel 180.

Also in frictional contact with the ratio change friction ball 182 is a second friction wheel 202 rotatably and coaxially mounted on the hollow shaft 140. The second friction wheel 202 is rigidly connected via a sleeve 204 to a sun gear 168 (corresponding to the small diameter section 68 of the idler gear 164 in the FIG. 1 embodiment) also rotatably and coaxially mounted on the hollow shaft 140. The sun gear 168 meshes with the planet gear 124 of the planet gear set 120.

If necessary to afford firm frictional contact between ratio change friction ball 182 and second friction wheel 202, a plurality of compression springs 206 and a thrust bearing 208 may be installed as shown between planet carrier 134 and sun gear 168. Alternatively, the second friction wheel 202 and the sun gear 168 may be formed as separate members and may be interconnected via a suitable cam clutch or the like. The other details of construction of this transmission are identical with those of the FIG. 2 embodiment.

In the use of the variable speed transmission of FIG. 3 the support frame 186 is to be pivoted, as by a lever or handwheel suitably connected thereto, about the axis of the support frame trunnion pair 200, as indicated by the double headed arrow. With the consequent change in the angle of the rotational axis of the ratio change friction ball 182 relative to the rotational axis of the first 180 and second 202 friction wheels, the corresponding change occurs in the distances between the rotational axis of the friction ball and its point of contact with the first friction wheel and between the rotational axis of the friction ball and its point of contact with the second friction wheel. Thus, as the internal gear 156 drives the pinion 158, the first friction wheel 180 integral with the internal gear drives the second friction wheel 202 at a variable speed. It is thus possible to continuously vary the speed ratio of the transmission input shaft 110 and output shaft 112.

FOURTH FORM

Figure 4:
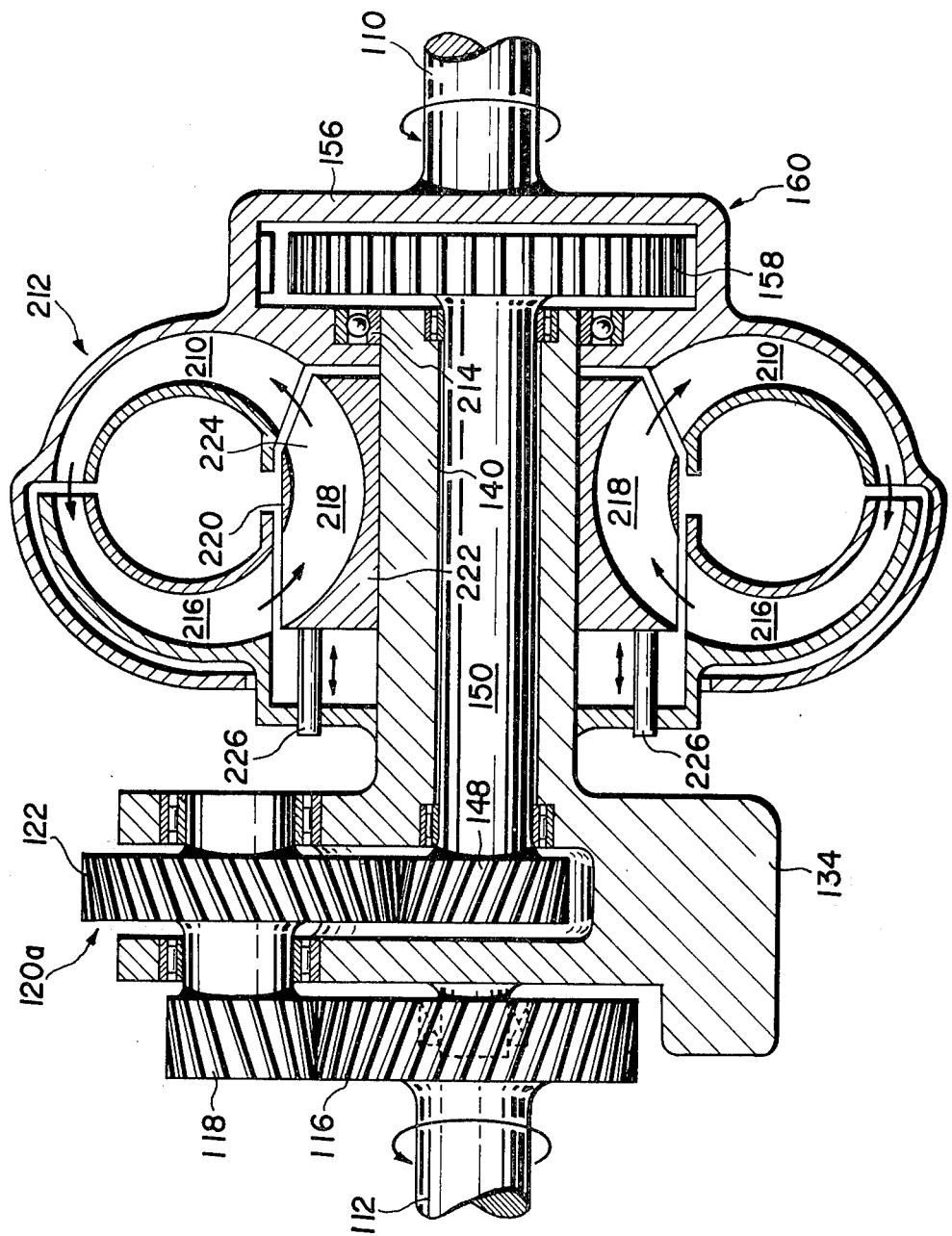
FIG. 4 is a similar view of a still further preferred form of the transmission according to my invention, which basically is also of the type shown in FIG. 2 but which employs a fluid coupling to change speed.

FIG. 4 shows my invention as adapted for use with a fluid coupling as the means for continuously varying the speed ratio. This FIG. 4 embodiment is also similar in basic configuration to that of FIG. 2, so that the same reference numerals will also be employed to designate the corresponding parts of these two embodiments.

Driven by a suitable drive source such as, for example, an internal combustion engine, the transmission input shaft 110 is connected to the internal gear 156 of the internal gear assembly 160. The internal gear 156 is formed integral with the impeller 210 of a ratio change fluid coupling 212. The shell or outer wall of the impeller 210 is rotatably mounted on the hollow shaft 140 via a bearing 214. The fluid coupling 212 has its turbine 216 secured to the hollow shaft 140.

The ratio change fluid coupling 212 further includes a flow regulator 218 movable axially to control the circulation of the working fluid, usually oil, through the circuit formed by the impeller 210 and the turbine 216. The flow regulator 218 comprises a baffle 220, a sleeve-like support 222 fitted over the hollow shaft 140 for axial sliding motion relative to same, and a plurality of connector plates 224 serving merely to mechanically connect the baffle 220 to the support 222. The fluid coupling 212 further includes a plurality of actuator rods 226 connecting the support 222 of the flow regulator 218 to a suitable actuating mechanism, not shown, disposed exteriorly of the coupling. As required, a splined connection or the like may be employed between hollow shaft 140 and flow regulator support 222.

Since the turbine 216 of the ratio change fluid coupling 212 is secured to the hollow shaft 140 in this embodiment, the transmission of FIG. 4 has no gear corresponding to the idler gear 64 or 164 of the preceding embodiments. Nor does it have the third planet gear 24 or 124 of the preceding embodiments. Comprising only the two planet gears 118 and 122, the planet gear set of FIG. 4 embodiment is therefore generally designated 120a. The other details of construction are identical with those of, for example, the FIG. 2 embodiment.

The flow regulator 218 of the ratio change fluid coupling 212 does not perform the function of the reactor or stator in a hydraulic torque converter, even if reactor blades were employed in lieu of the connector plates 224. This is because the flow regulator 218 is not locked against rotation with respect to the impeller 210 and turbine 216.

When the flow regulator 218 lies in the normal position as shown, its baffle 220 is held retracted away from the flow circuit of the working fluid. The flow rate of the working fluid through the circuit can be adjustably varied by moving the flow regulator 218 in the axial direction, as the baffle 220 increases or decreases the effective area of the exit opening of the turbine 216. The speed ratio of the transmission input shaft 110 and output shaft 112 can thus be varied continuously.

A hydraulic torque converter could of course be substituted for the fluid coupling in the FIG. 4 embodiment. In order to realize this alternative the impeller of a torque converter may be disposed on the left hand side, as viewed in FIG. 4, and may be integrally connected to the internal gear 156 via a driving shell. Disposed on the right hand side of the impeller, the turbine of the torque converter may be secured to the hollow shaft 140. It is then possible to lock the reactor of the torque converter against rotation while permitting its axial motion.

It is to be understood that I have chosen the foregoing embodiments merely to illustrate my invention; indeed, they are but a few of the numerous possible embodiments of my invention. A wide variety of modifications, variations or adaptations will readily occur to the specialists to conform to design preferences or to the requirements of specific applications, without departing from the spirit or scope of my invention as sought to be defined by the following claims.

I claim:

1. A variable speed transmission comprising:
   (a) an input shaft rotatable about a first axis;
   (b) an output shaft in axial alignment with the input shaft;
   (c) an internal gear assembly comprising an internal gear and a pinion in mesh therewith, the internal gear assembly being connected to either of the input shaft and the output shaft, with the internal gear connected on the input side and the pinion on the output side; the internal diameter of the internal gear being somewhat larger than the external diameter of the pinion;
   (d) a first sun gear fixedly and coaxially mounted on the other of the input shaft and the output shaft;
   (e) a planet gear set in mesh with the first sun gear;
   (f) a planet carrier rotatably carrying the planet gear set and adapted for rotation about the first axis;
   (g) an eccentric shaft connected at one end to the internal gear assembly and rotatably supported by the planet carrier for rotation about a second axis which is offset from and parallel to the first axis and which is subject to angular displacement about the first axis, the eccentric shaft being further revolvable with the planet carrier about the first axis;
   (h) a second sun gear fixedly and coaxially mounted on the other end of the eccentric shaft and meshing with the planet gear set; and
   (i) means interposed between the input shaft and the output shaft for continuously varying their speed ratio.

2. The variable speed transmission as recited in claim 1, further comprising a rotatable hollow shaft formed integral with the planet carrier and disposed in axial alignment with the input shaft and the output shaft, the hollow shaft having a bore formed eccentrically therethrough, the eccentric shaft rotatably extending through the bore in the hollow shaft.

3. The variable speed transmission as recited in claim 2, wherein the continuously varying means comprises:
   (a) an idler gear rotatably mounted on the hollow shaft and meshing with the planet gear set;
   (b) a ratio change gear meshing with the idler gear; and
   (c) an electric motor connected to the ratio change gear for driving same.

4. A variable speed transmission comprising:
   (a) an input shaft;
   (b) an output shaft in axial alignment with the input shaft;
   (c) an internal gear fixedly and coaxially mounted on the input shaft;
   (d) a hollow shaft rotatably disposed between and in axial alignment with the input shaft and the output shaft, the hollow shaft having a bore formed eccentrically therethrough;
   (e) an eccentric shaft rotatably extending through the bore in the hollow shaft;
   (f) a pinion fixedly and coaxially mounted on one end of the eccentric shaft and meshing with the internal gear;
   (g) a first sun gear fixedly and coaxially mounted on the other end of the eccentric shaft;
   (h) a planet gear set meshing with the first sun gear;
   (i) a planet carrier rotatably supporting the planet gear set and formed integral with the hollow shaft for simultaneous rotation therewith about the axis of the aligned input shaft and output shaft;
   (j) a second sun gear fixedly and coaxially mounted on the output shaft and meshing with the planet gear set; and (k) means interposed between the input shaft and the output shaft for continuously varying their speed ratio.

5. The variable speed transmission as recited in claim 4, wherein the continuously varying means comprises:
(a) a first friction wheel formed integral with the internal gear;
(b) a second friction wheel rotatably mounted on the hollow shaft;
(c) a friction ball making frictional contact with the first and the second friction wheels and supported for rotation about an axis in coplanar relationship to the axis of rotation of the first and the second friction wheels, the angle of the rotational axis of the friction ball relative to the rotational axis of the first and the second friction wheels being adjustably variable; and
(d) a third sun gear rotatably mounted on the hollow shaft and meshing with the planet gear set, the third sun gear being connected to the second friction wheel for simultaneous rotation therewith.

6. The variable speed transmission as recited in claim 4, wherein the continuously varying means comprises:
(a) an impeller connected to the internal gear for simultaneous rotation therewith;
(b) a turbine connected to the hollow shaft for simultaneous rotation therewith and coacting with the impeller to form a circuit for the flow of a working fluid; and
(c) a flow regulator movably mounted between the impeller and the turbine for adjustably varying the flow rate of the working fluid through the circuit.

* * * * *